(12) United States Patent
Dasgupta et al.

(10) Patent No.: US 10,009,364 B2
(45) Date of Patent: Jun. 26, 2018

(54) GATHERING FLOW CHARACTERISTICS FOR ANOMALY DETECTION SYSTEMS IN PRESENCE OF ASYMMETRICAL ROUTING

(71) Applicant: Cisco Technology, Inc., San Jose, CA (US)

(72) Inventors: Sukrit Dasgupta, Norwood, MA (US); Jean-Philippe Vasseur, Anchorage, AK (US); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 15/212,430

(22) Filed: Jul. 18, 2016

(65) Prior Publication Data

US 2017/0279837 A1    Sep. 28, 2017

Related U.S. Application Data

(60) Provisional application No. 62/313,465, filed on Mar. 25, 2016.

(51) Int. Cl.
*H04L 29/06*   (2006.01)
*H04L 12/851*   (2013.01)
*H04L 12/26*   (2006.01)

(52) U.S. Cl.
CPC ......... *H04L 63/1425* (2013.01); *H04L 43/16* (2013.01); *H04L 47/2483* (2013.01); *H04L 63/1416* (2013.01); *H04L 63/1458* (2013.01)

(58) Field of Classification Search
CPC ............. H04L 63/1425; H04L 63/1433; H04L 63/145; H04L 63/1458; H04L 63/1416;
(Continued)

(56) References Cited

U.S. PATENT DOCUMENTS 6,831,912 B1   12/2004  Sherman
7,227,872 B1    6/2007  Biswas et al.
(Continued)

OTHER PUBLICATIONS

Giotis, Kostas, et al. "Combining OpenFlow and sFlow for an effective and scalable anomaly detection and mitigation mechanism on SDN environments." Computer Networks 62 (2014): 122-136.*
(Continued)

*Primary Examiner* — Syed Zaidi
(74) *Attorney, Agent, or Firm* — Parker Ibrahim & Berg LLP; James M. Behmke; Stephen D. LeBarron

(57) ABSTRACT

In one embodiment, a first device in a network identifies a first traffic flow between two endpoints that traverses the first device in a first direction. The first device receives information from a second device in the network regarding a second traffic flow between the two endpoints that traverses the second device in a second direction that is opposite that of the first direction. The first device merges characteristics of the first traffic flow captured by the first device with characteristics of the second traffic flow captured by the second device and included in the information received from the second device, to form an input feature set. The first device detects an anomaly in the network by analyzing the input feature set using a machine learning-based anomaly detector.

20 Claims, 13 Drawing Sheets

(58) Field of Classification Search
CPC . H04L 63/1408; H04L 63/06; H04L 47/2483;
H04L 43/16
USPC .......................................................... 726/23
See application file for complete search history.

(56) References Cited

U.S. PATENT DOCUMENTS

| | | | | |
|---|---|---|---|---|
| 7,343,093 | B2* | 3/2008 | Oberg | H04B 10/032 398/3 |
| 7,483,433 | B2 | 1/2009 | Simmons et al. | |
| 7,653,075 | B2 | 1/2010 | Singh et al. | |
| 7,991,864 | B2 | 8/2011 | Patel et al. | |
| 8,032,641 | B2 | 10/2011 | Li et al. | |
| 8,504,504 | B2 | 8/2013 | Liu | |
| 9,083,609 | B2* | 7/2015 | Casado | H04L 41/06 |
| 9,565,080 | B2* | 2/2017 | Jain | H04L 41/0826 |
| 9,876,808 | B2* | 1/2018 | Lim | H04L 43/026 |
| 2006/0268932 | A1* | 11/2006 | Singh | H04L 12/4633 370/468 |
| 2010/0154059 | A1* | 6/2010 | McNamee | H04L 43/00 726/23 |
| 2012/0198062 | A1* | 8/2012 | Di Pietro | H04L 43/026 709/224 |
| 2014/0075557 | A1* | 3/2014 | Balabine | H04L 63/20 726/23 |
| 2014/0136684 | A1* | 5/2014 | Jain | H04L 41/5035 709/224 |
| 2014/0310390 | A1 | 10/2014 | Sorenson, III et al. | |
| 2014/0325649 | A1* | 10/2014 | Zhang | H04L 43/024 726/23 |
| 2015/0106308 | A1 | 4/2015 | Harrison et al. | |
| 2015/0180898 | A1* | 6/2015 | Liljenstam | H04W 12/12 726/23 |
| 2015/0193693 | A1 | 7/2015 | Vasseur et al. | |
| 2015/0193694 | A1 | 7/2015 | Vasseur et al. | |
| 2016/0028750 | A1 | 1/2016 | Di Pietro et al. | |
| 2016/0028751 | A1 | 1/2016 | Cruz Mota et al. | |
| 2016/0142266 | A1* | 5/2016 | Carroll | H04L 41/16 706/12 |

OTHER PUBLICATIONS

Minarik, Pavel, Jan Vykopal, and Vojtech Krmicek. "Improving host profiling with bidirectional flows." Computational Science and Engineering, 2009. CSE'09. International Conference on. vol. 3. IEEE, 2009.*

European Search Report dated Aug. 4, 2017 in connection with European Application No. 17 16 2418.

Lancope, Inc.—Network Performance + Security Monitoring™; "Buyer's Guide Not All NetFlow™ Systems Are Created Equal" 2011; pp. 1-8.

* cited by examiner

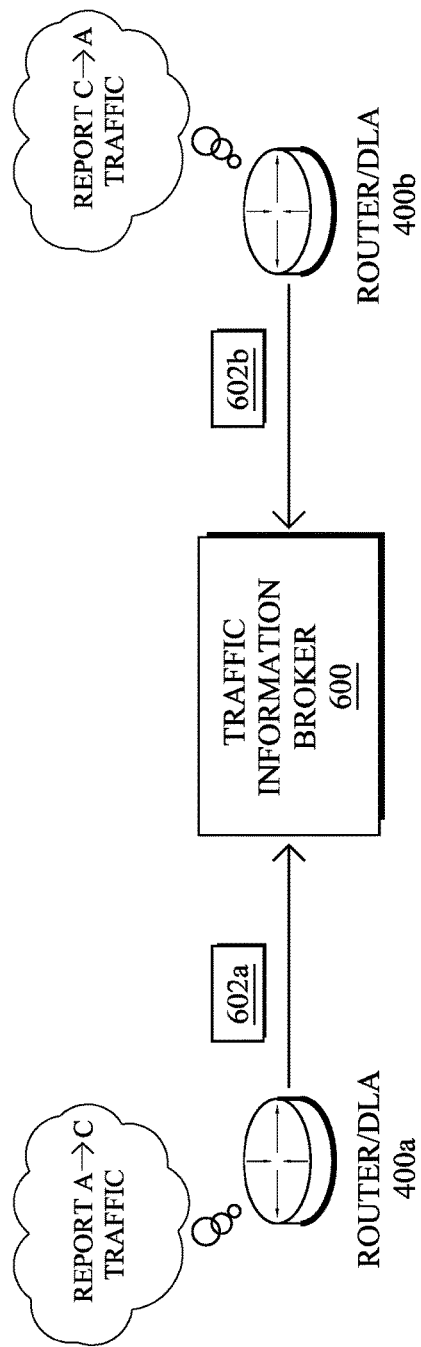
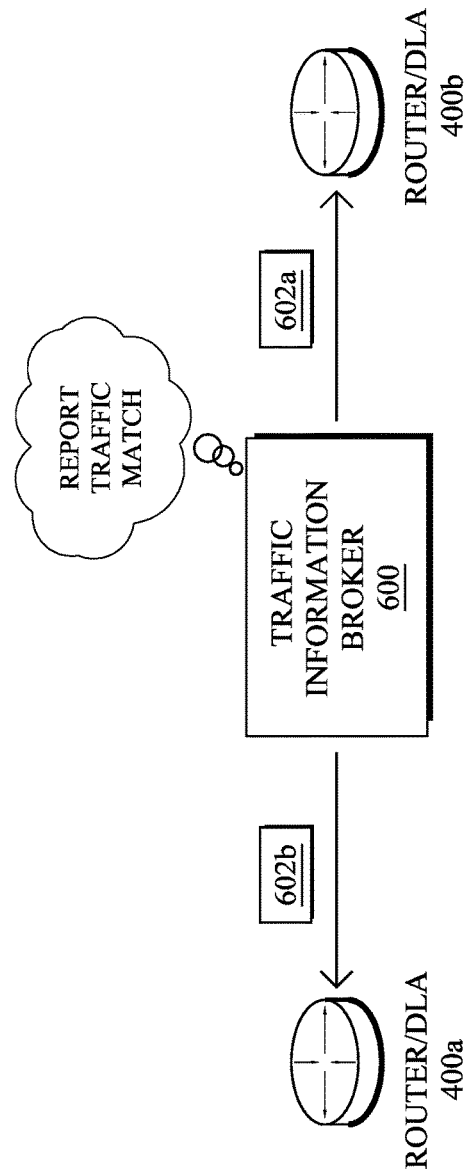

GATHERING FLOW CHARACTERISTICS FOR ANOMALY DETECTION SYSTEMS IN PRESENCE OF ASYMMETRICAL ROUTING

RELATED APPLICATION

This application claims priority to U.S. Provisional Application No. 62/313,465, filed on Mar. 25, 2016, entitled DISTRIBUTED ANOMALY DETECTION MANAGEMENT, by Dasgupta, et al., the contents of which are herein incorporated by reference.

TECHNICAL FIELD

The present disclosure relates generally to computer networks, and, more particularly, to gathering flow characteristics for anomaly detection systems in presence of asymmetrical routing.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6D illustrate examples of using a traffic information broker to identify asymmetrically-routed traffic.

DESCRIPTION OF EXAMPLE EMBODIMENTS

Overview

Figure 1A:
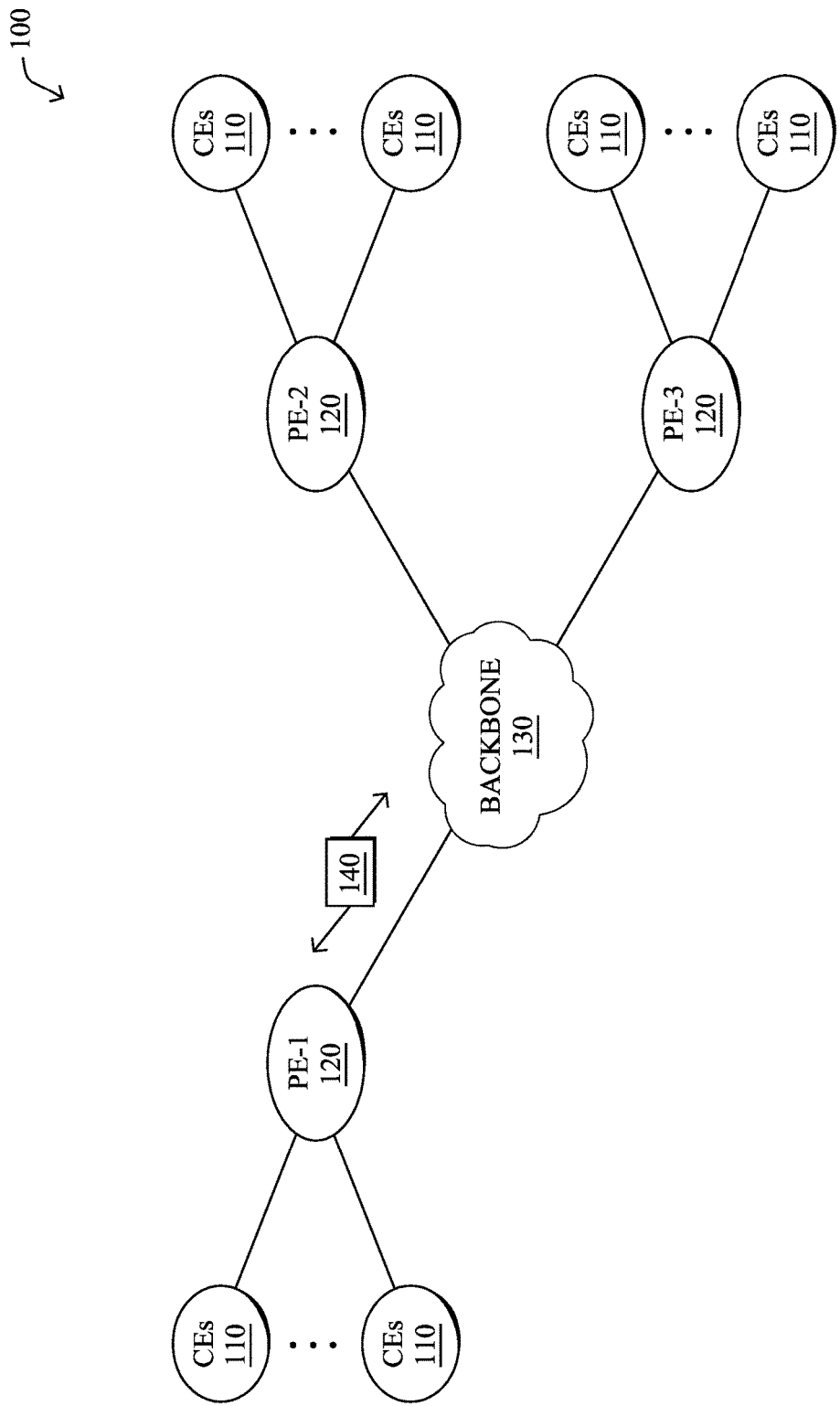
FIGS. 1A-1B illustrate an example communication network.

According to one or more embodiments of the disclosure, a first device in a network identifies a first traffic flow between two endpoints that traverses the first device in a first direction. The first device receives information from a second device in the network regarding a second traffic flow between the two endpoints that traverses the second device in a second direction that is opposite that of the first direction. The first device merges characteristics of the first traffic flow captured by the first device with characteristics of the second traffic flow captured by the second device and included in the information received from the second device, to form an input feature set. The first device detects an anomaly in the network by analyzing the input feature set using a machine learning-based anomaly detector.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
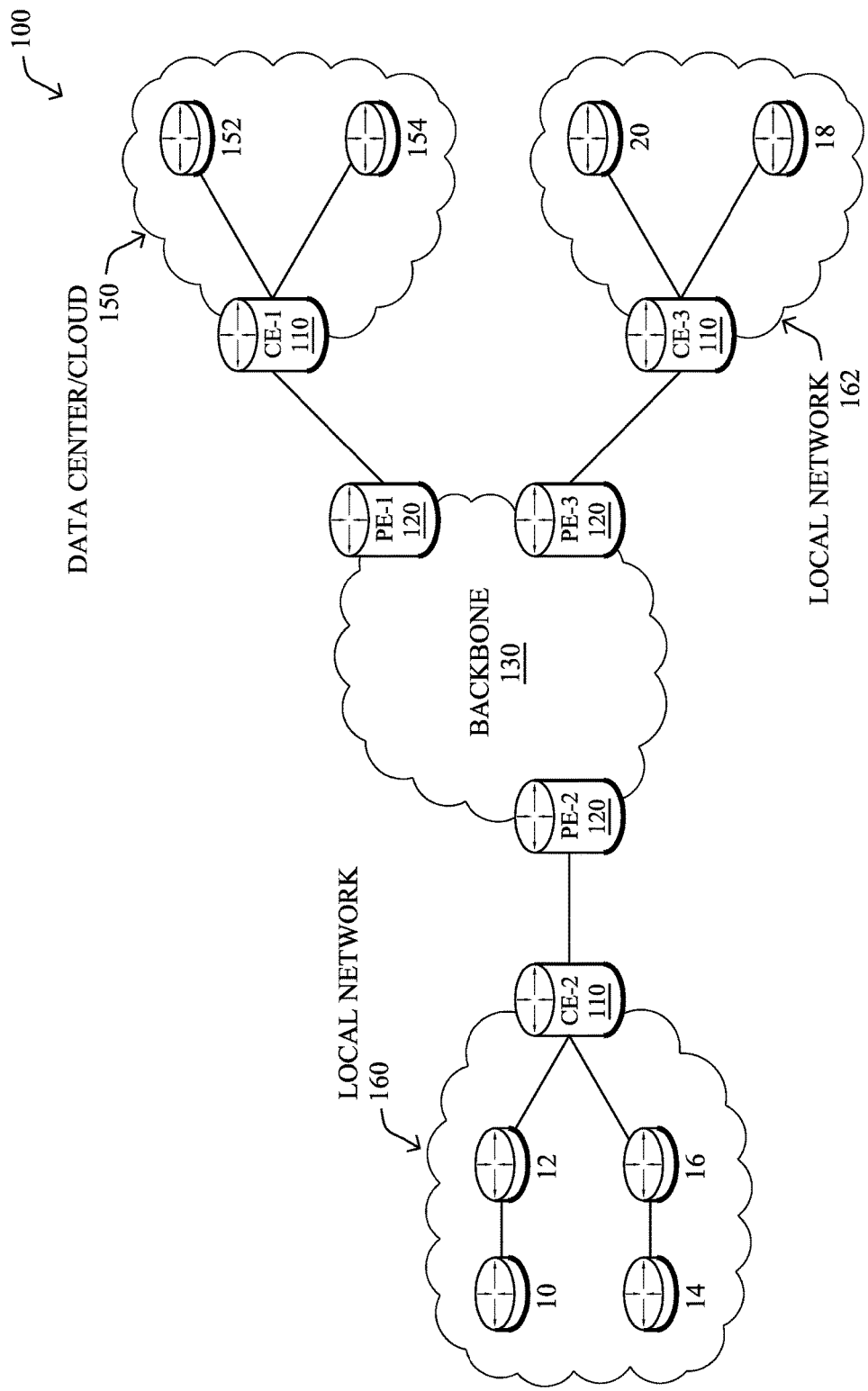

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
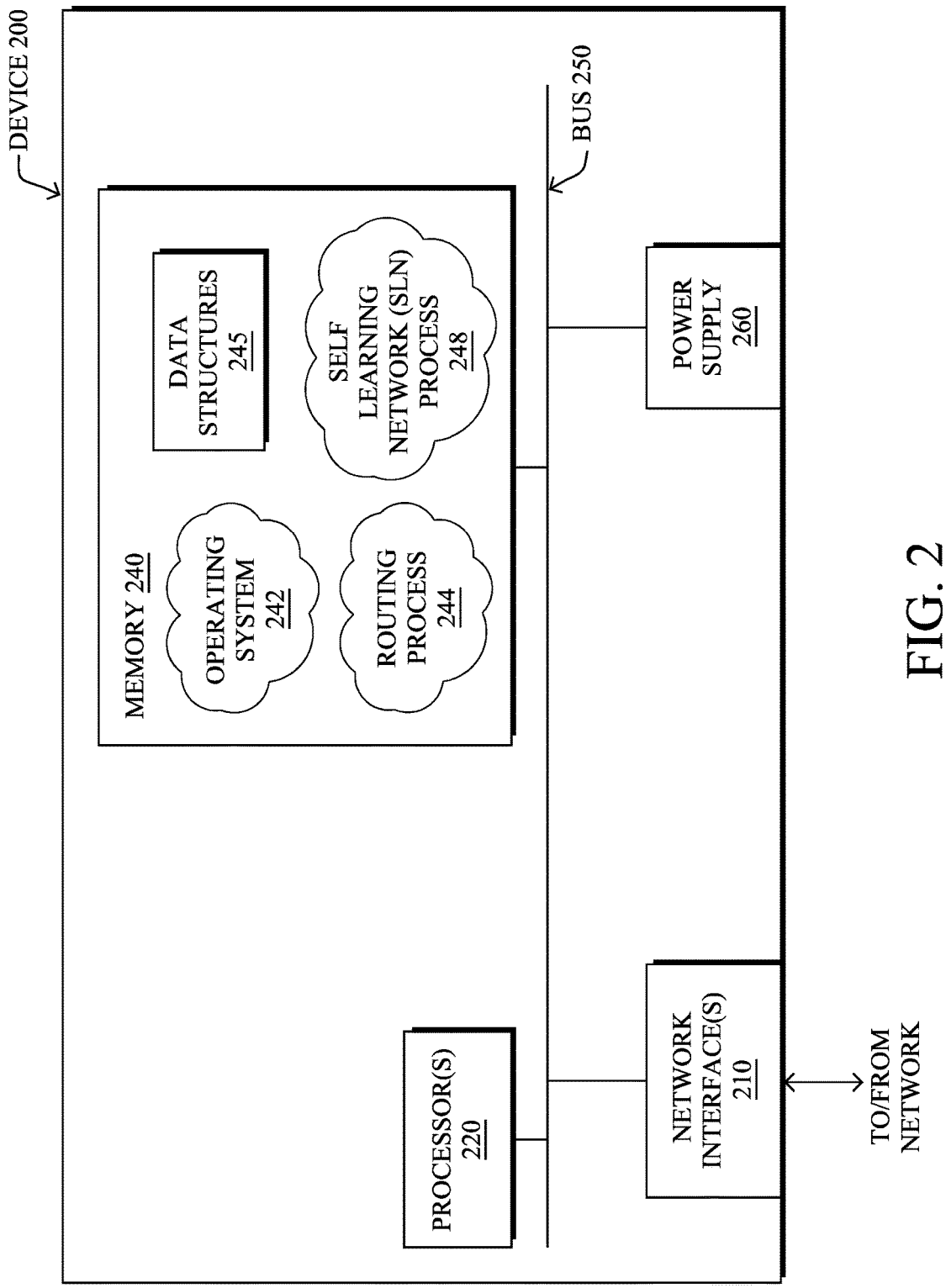
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
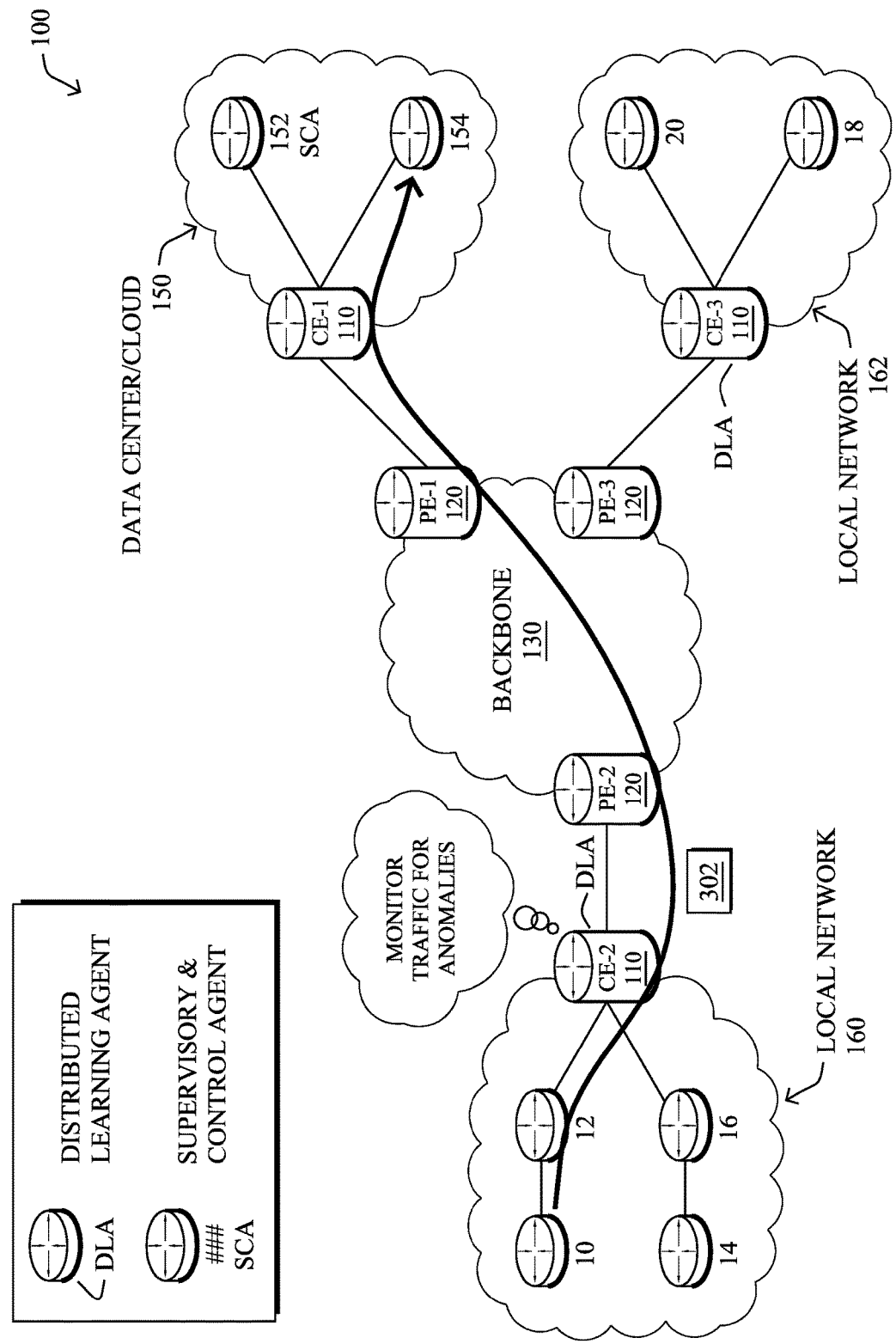
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
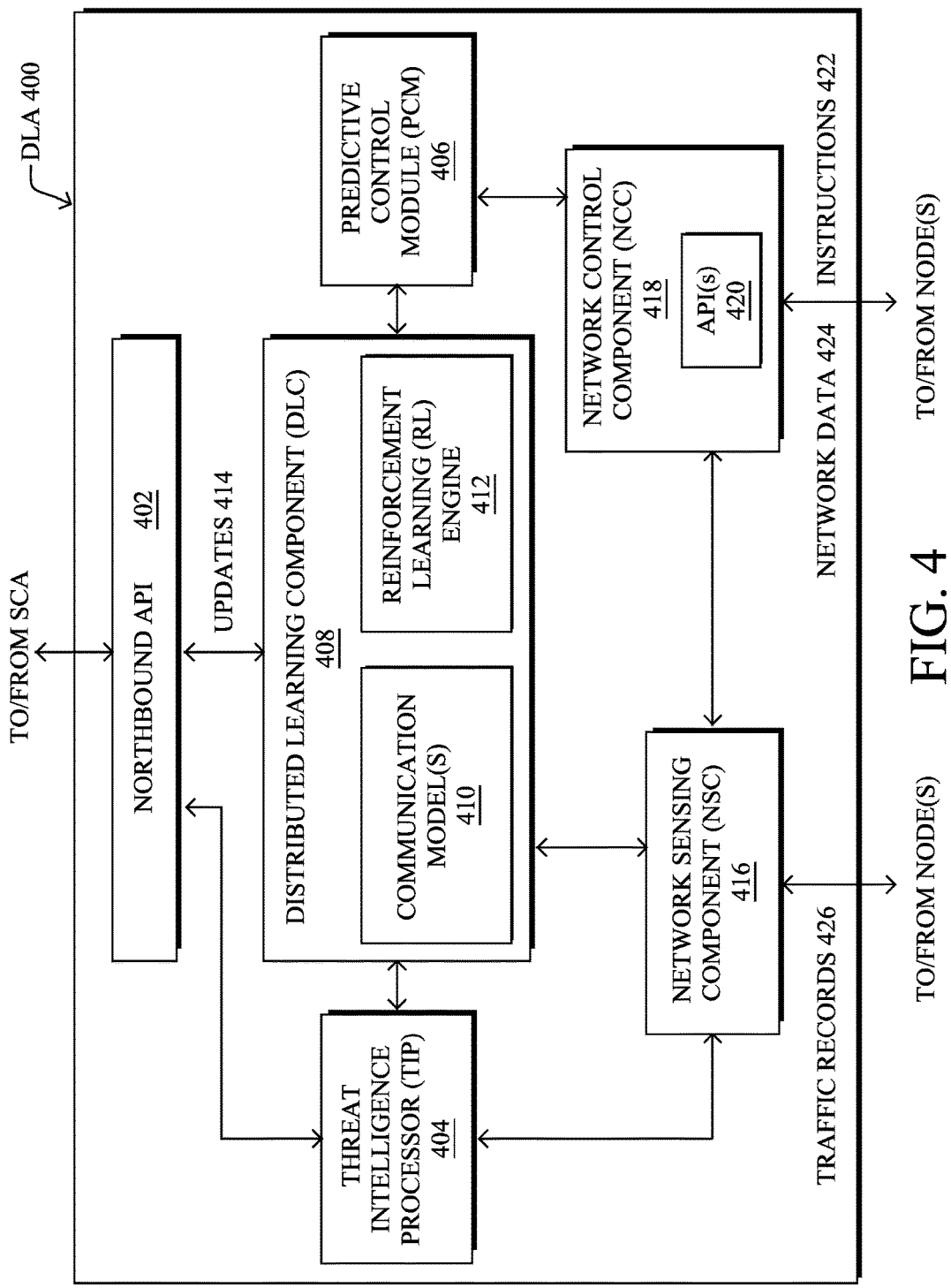
FIG. 4 illustrates an example distributed learning agent (DLA) in an SLN.

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As mentioned above, anomaly detection systems take as input a number of traffic sources, to build traffic/application models. For example, an anomaly detector may model input data including, but not limited to, Netflow or similar traffic records, applications-specific information gathered thanks to deep packet inspection (DPI) (e.g., for DNS entropy of queried names, number and size of TXT/ . . . records, etc.), local state information from network elements (e.g., routers, switches, wireless access points, etc.) such as L2/L3 routing tables, interface related counters, QoS parameters, Forward Information Base (FIB) data, etc. In turn, NSC 416 of DLA 400 may aggregate the information from the various sources into an input dataset for consumption by DLC 408.

In many circumstance, machine learning-based techniques make use of features that require data regarding all flows (bidirectional) of a conversation. For example, with a protocol such as DNS, the ratio between inbound and outbound traffic may be key to detecting specific DNS attacks. There are also circumstances where it is of the utmost interest to gather related information for the return flow to add context to a detected anomaly. For example, when detecting an anomaly such as an external attempt to perform scanning, it becomes highly relevant to see whether the flow was bidirectional, e.g., to determine whether the host under attack replied to the scanning host. These are a very few examples of situations where seeing both the inbound and outbound traffic for the flows between a pair a devices is critical and may even lead to not detecting specific attacks, if only one direction is seen by DLA 400.

The issue, though, is that routing is in essence highly directional in the Internet. For most routing protocols, there is no guarantee that the inbound and outbound traffic will follow the same path, with very few exceptions (e.g., Bidirectional LSP in GMPLS networks). Notably, even Traffic Engineering LSPs are unidirectional. In the case of a branch office dual-attached to the WAN via two routers, there is a high chance that some of the traffic flows will be asymmetrically routed. The issue is even broader in presence of per-packet or per-destination load balancing (e.g., Equal Cost Multiple Path—ECMP) between both exit routers, in which case the outbound traffic may itself be split across two paths.

——Gathering Flow Characteristics for Anomaly Detection Systems in Presence of Asymmetrical Routing——

The techniques herein, therefore, address the issue of asymmetrical routing in distributed learning architectures, such as SLNs. In particular, the techniques herein specify an approach that: 1.) allows for discovering the presence of asymmetrical routing and load balancing for traffic subject to modeling, 2.) discovers all networking devices traversed the (missing) traffic related to flows of interest, 3.) dynamically elects one of the DLAs to receive the missing traffic information and 4.) processes the traffic characteristics and model the related traffic/application based on the aggregation of traffic information received from all the peers.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a first device in a network identifies a first traffic flow between two endpoints that traverses the first device in a first direction. The first device receives information from a second device in the network regarding a second traffic flow between the two endpoints that traverses the second device in a second direction that is opposite that of the first direction. The first device merges characteristics of the first traffic flow captured by the first device with characteristics of the second traffic flow captured by the second device and included in the information received from the second device, to form an input feature set. The first device detects an anomaly in the network by analyzing the input feature set using a machine learning-based anomaly detector.

Operationally, and with reference generally to FIGS. 5A-5E, there are many situations where asymmetrical routing may raise considerable issues for the DLAs. Consider, for example, the case shown in FIG. 5A of two routers/DLAs 400a-400b that both provide connectivity through WAN 130 for local/branch network 160. Within the local network 160 may be any number of hosts 502 (e.g., hosts A, B, and D shown) connected to routers/DLAs 400a-400b via intermediate networking devices 504, such as L2 switches, routers, etc.

In the network configuration shown, there are a few situations in which asymmetrical routing would take place (i.e., the inbound and outbound flows may not share the same path). In one situation traffic flow 506a flows from host A to remote host C via router 400a, whereas the return flow 500b flows from host C to host A via router 400b. Without going into considerable detail, there may be situations where symmetrical routing can be achieved with BGP, but it is not the case in most common situations.

In another scenario, traffic from host B to host C may traverse router 400a and the reverse traffic from host C to host B may traverse router 400b, both via switch 504a. In this case, routers 400a-400b would experience asymmetrical routing, but switch 500a would not. A further example may be due to the load balancing of traffic between hosts B and C via routers 400a-400b.

A first aspect of the techniques herein relies on the strong assumption that a common link state IGP is running in the network from the branch office to external BGP peering. In such (very limited) cases, each router configured as DLA may detect the presence of asymmetrical routing by performing a reverse shortest-path-first (SPF) computation from every other router the network followed by an analysis on the prefixes being routed on these IGP paths. Then, in this specific case, it becomes possible for router 400a to detect that traffic 506a will be sent via router 400a, whereas traffic 506b on the return path will transit via router 400b.

In the vast majority of the cases, e.g., with IGP in the branch offices and BGP or static routing on the CE-PE link, it becomes impossible for a router to make use of the routing protocol to detect the presence of asymmetrical paths, making the use of machine learning extremely challenging for traffic modeling. In this case, a new approach is specified herein whereby peer-routers located at the same site are discovered. Notably, two routers are peers when the inbound traffic is routed through one of them and the inbound traffic is routed through the other one, such as in the case of routers 400a-400b in the example shown.

The first step of the peer router discovery procedure entails determining the set of flows for which either the inbound or outbound traffic is missing, which can be easily determined by NSC 416 from its flow table. For example, as shown, router/DLA 400a may analyze its local flow table to determine that traffic flow 506a is an orphan flow (e.g., a flow for which a corresponding inbound or outbound flow is missing. For purposes of illustration, let T represent the set of orphan flows identified by router 400a.

Figure 5A:
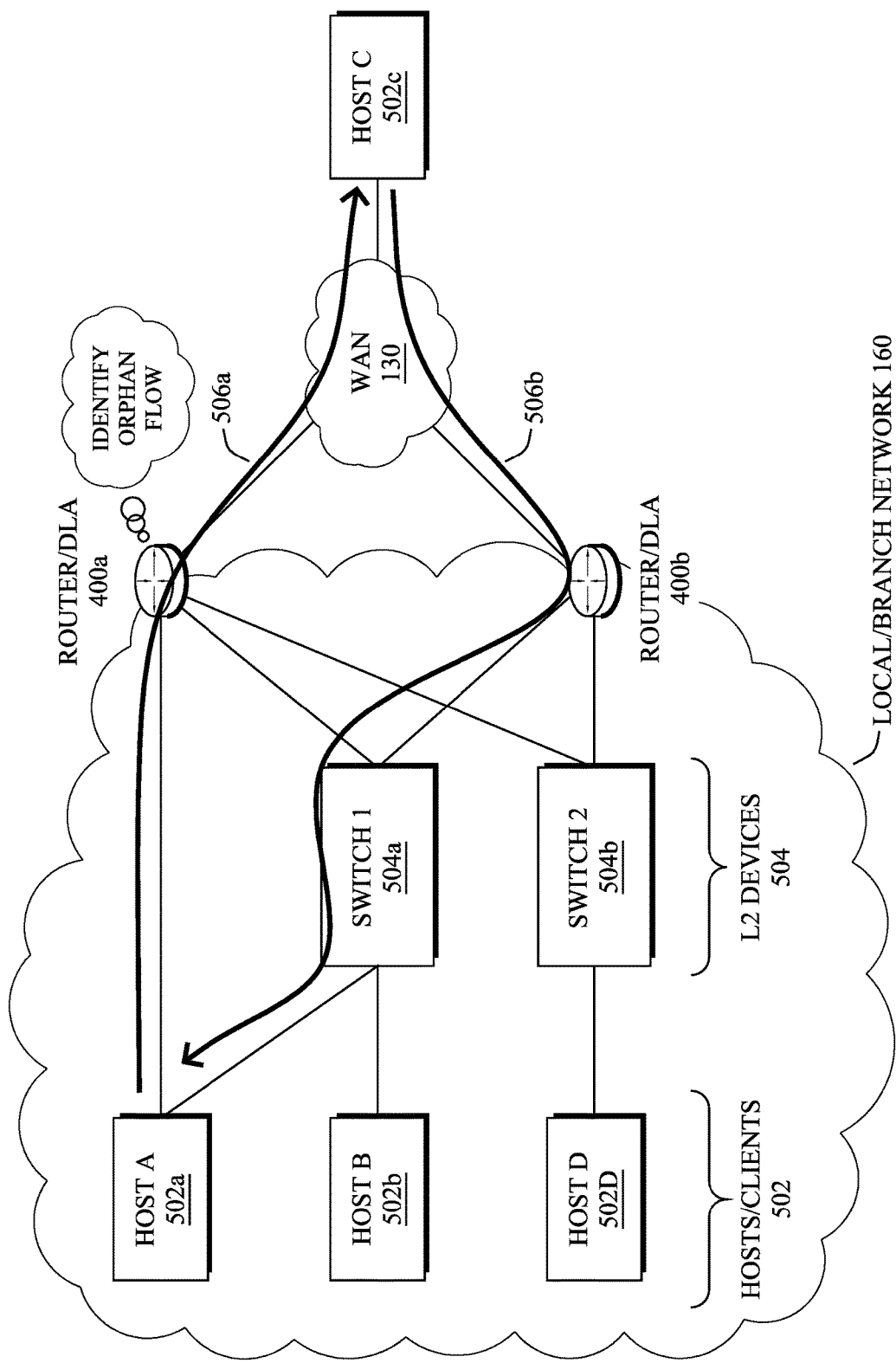
FIGS. 5A-5E illustrate examples of coordinating anomaly detection for asymmetrically-routed traffic.
Figure 5B:
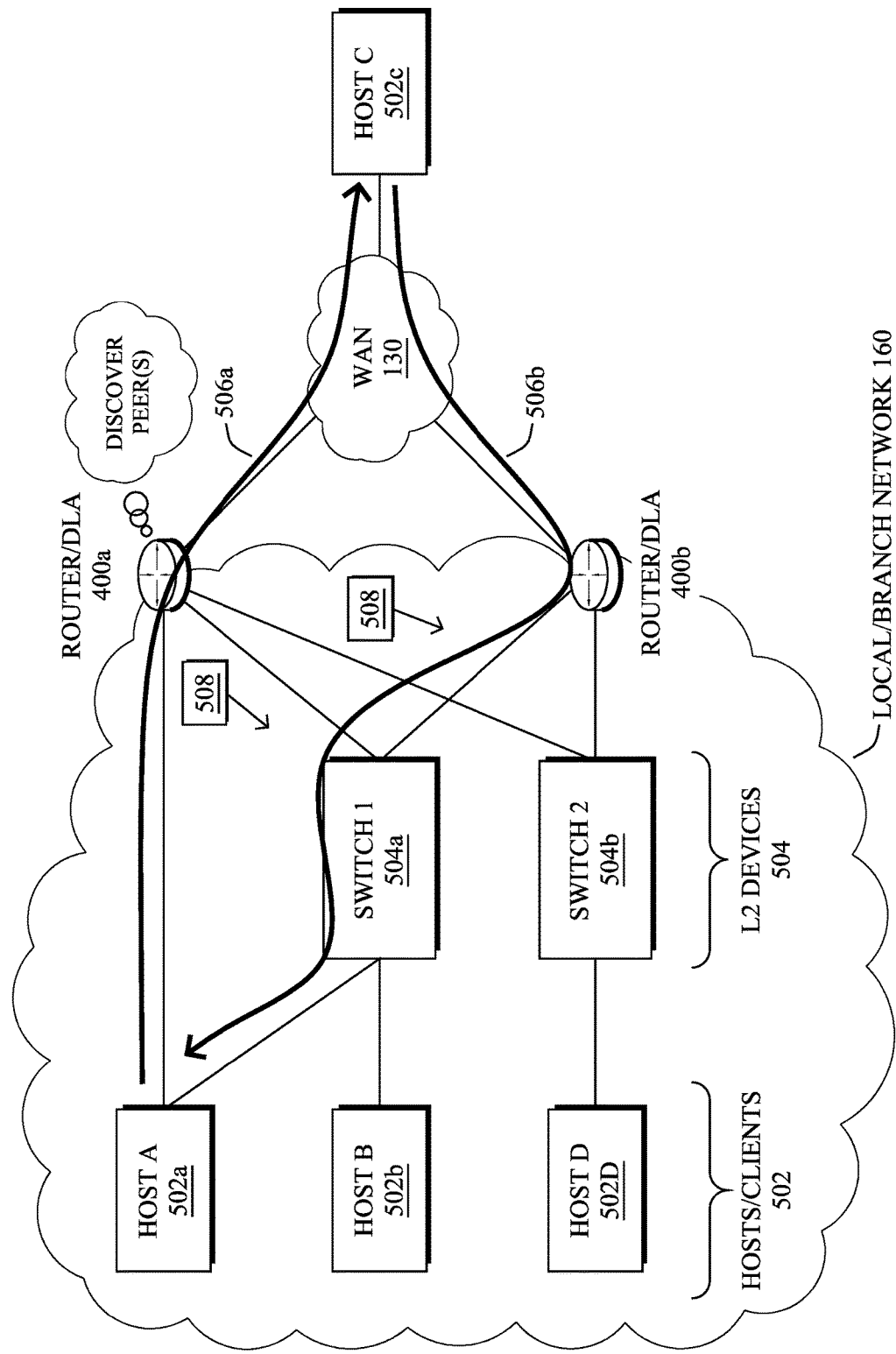

As shown in FIG. 5B, router 400a may attempt to identify the other devices/nodes in network 160 that encounter the opposing traffic flows that correspond to the set of orphan flows, T. In one embodiment, router/DLA 400a may send a newly defined peer-disco( ) message 508 as a broadcast or multicast message to all routers in local/branch network 160. In some embodiments, router/DLA 400a may do so using the Layer-2 and/or Layer-3 routing topology of network 160. Generally, message(s) 508 may include the set T of orphan flows identified by router/DLA 400a.

Figure 5C:
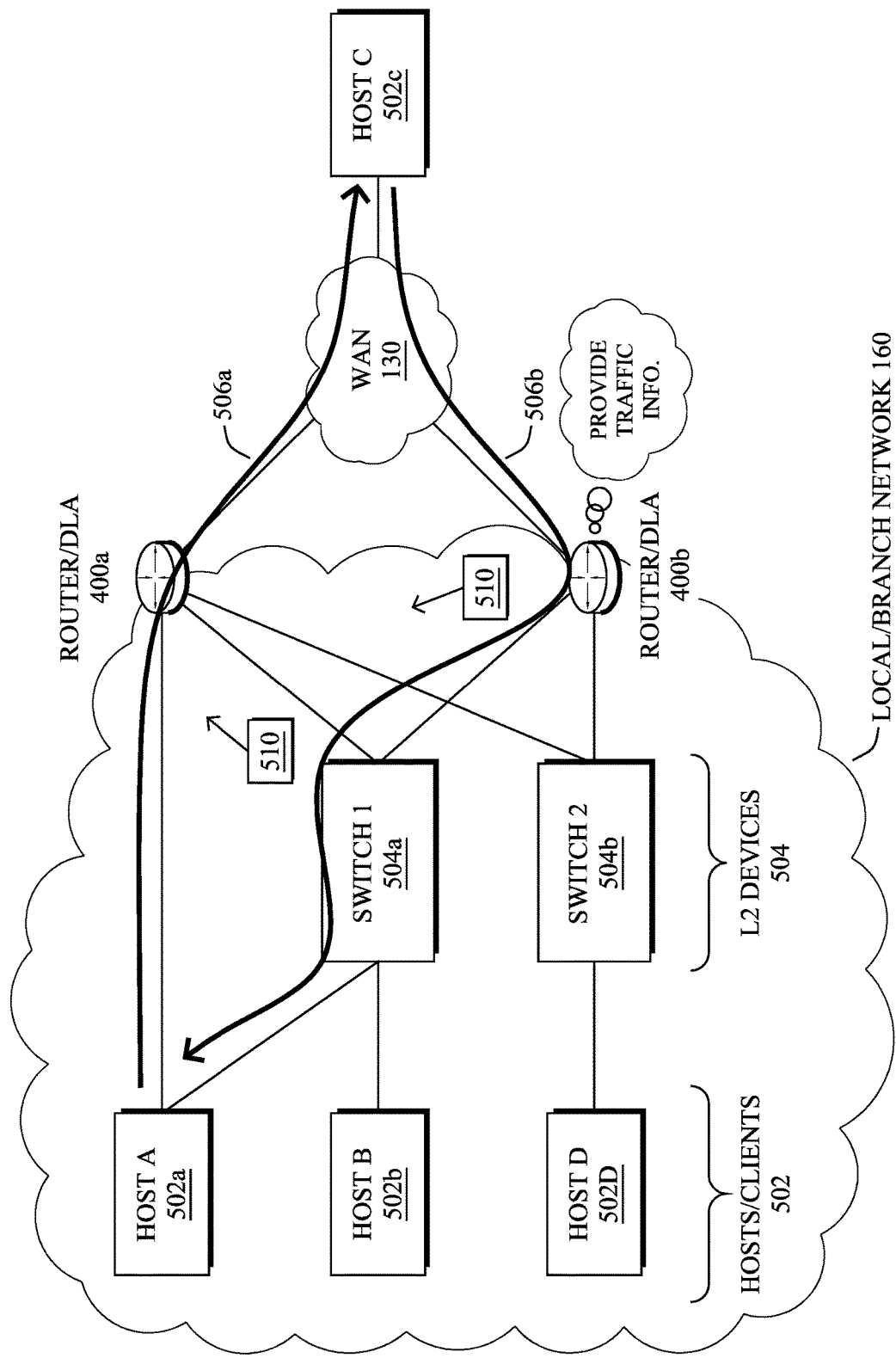

As shown in FIG. 5C, upon receiving a peer-disco( ) message 508, a networking device (e.g. router, switch, etc.) inspects its flow table, in order to see whether the flows of interested in the list T have been seen. Notably, the receiving node/device may locally maintain time-based historical data regarding the flows seen by the node/device. For example, if router 400b receives peer-disco( ) message 508 from router

400a and message 508 includes information regarding orphan flow 506a (e.g., the involved endpoint hosts, etc.), router 400b may determine that traffic flow 506b is a corresponding flow, since it flows in the opposite direction of flow 506a between endpoint hosts A and C.

In turn, router 400b may send a peer-present( )message 510 back to router 400a, which may also include information regarding flow 506b. For example, reply message 510 may also include Netflow or similar traffic records for flow 506b, a representative sample of such records or of flow 506b itself, or the like. At this point, router 400b may also cache the set T of orphan flows of router 400a and, should router 400b encounter a corresponding flow at a later time, send an unsolicited peer-present( ) message back to router 400a.

After receiving peer-present( ) reply messages from the other devices in network 160, router/DLA 400a may aggregate the responses to identify all of the networking devices traversed by flows of interest that correspond to those listed in the set T. DLA 400a then determines the list of networking devices that see the same conversation traffic. For example, DLA 400a may compare the Netflow or similar traffic records of its own flows to the records included in responses 510. The objective of this step is for router/DLA 400a to find the networking devices that see the same flows (e.g., flows traversing both devices), at least some of the flows of interest (e.g., due to load balancing), and/or at least some flows in a different direction (e.g., due to asymmetrical routing). Router/DLA 400a then computes a list P of all peer routers for the list of flows of interest listed in the list T.

Thus, the above techniques allow any networking device in the network to identify which other network devices are traversed by flows which belong to the same conversation of interest. For example, router 400a may determine that it sees outbound DNS traffic 506a from host A to a DNS server C, whereas the inbound DNS traffic 506b traverses peer router 400b. Consequently, without the techniques herein, router/DLA 400a would only be able to model and analyze only a portion of the DNS traffic, if at all. Note that this condition may apply to all traffic. Further, a DLA may decide that a peer seeing traffic in reverse direction is not of interest (e.g., for example the flows that match the list T may not be of interest for purposes of modeling).

Figure 5D:
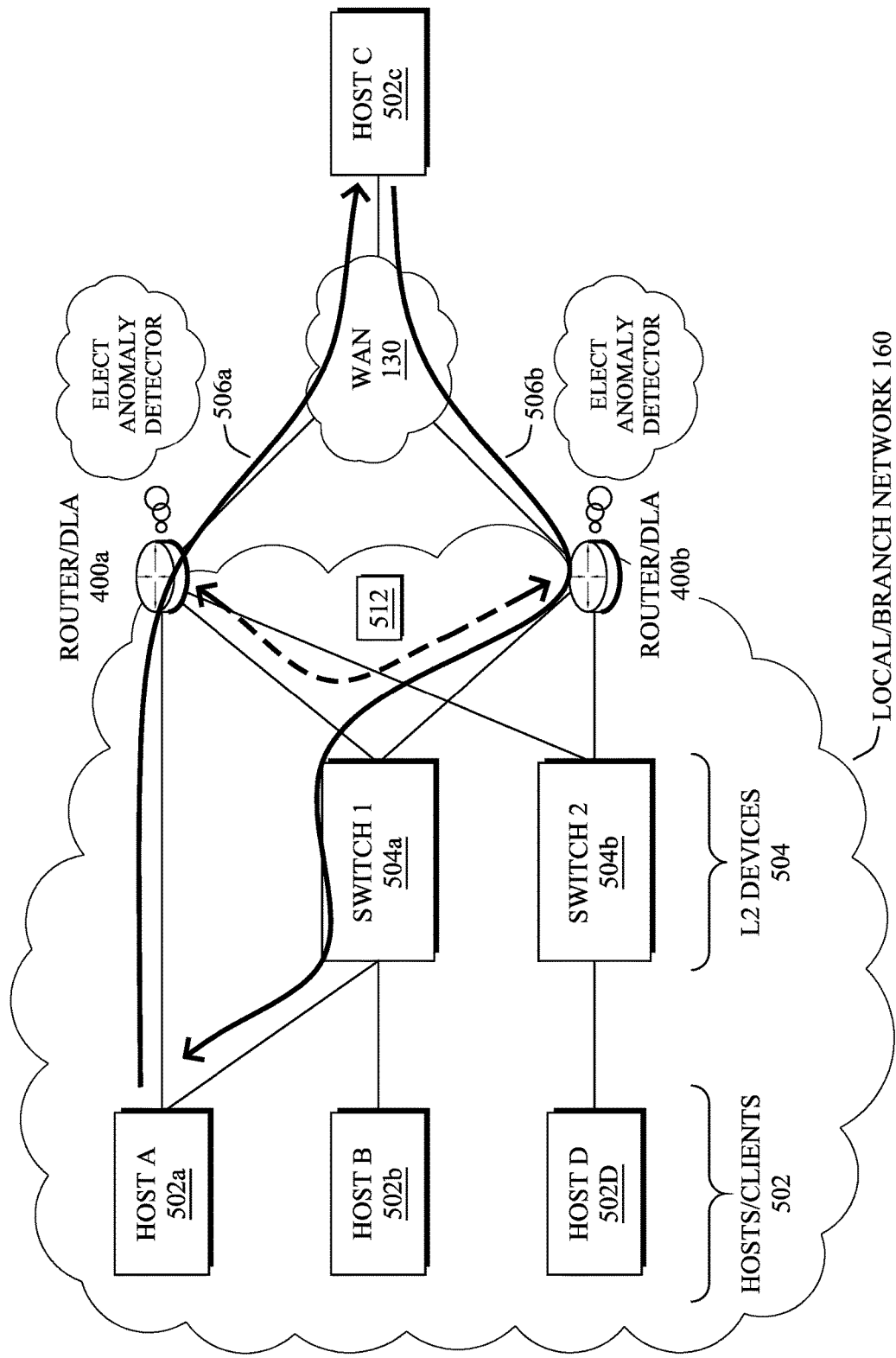

As shown in FIG. 5D, another aspect of the techniques herein is a dynamic election process whereby peer-routers elect the primary router in charge of modeling the traffic listed in their respective list T. Notably, routers/DLAs 400a-400b may exchange messages 512, to coordinate which of the DLAs should be responsible for analyzing the conversation that comprises traffic flows 506a-506b. DLAs 400a-400b may use various criteria for the election process. For example, DLAs 400a-400b may exchange and compare information such as the current, average, or maximum available resource on the respective DLAs 400a-400b, the highest proportion of traffic for the flows of interest, etc.

Figure 5E:
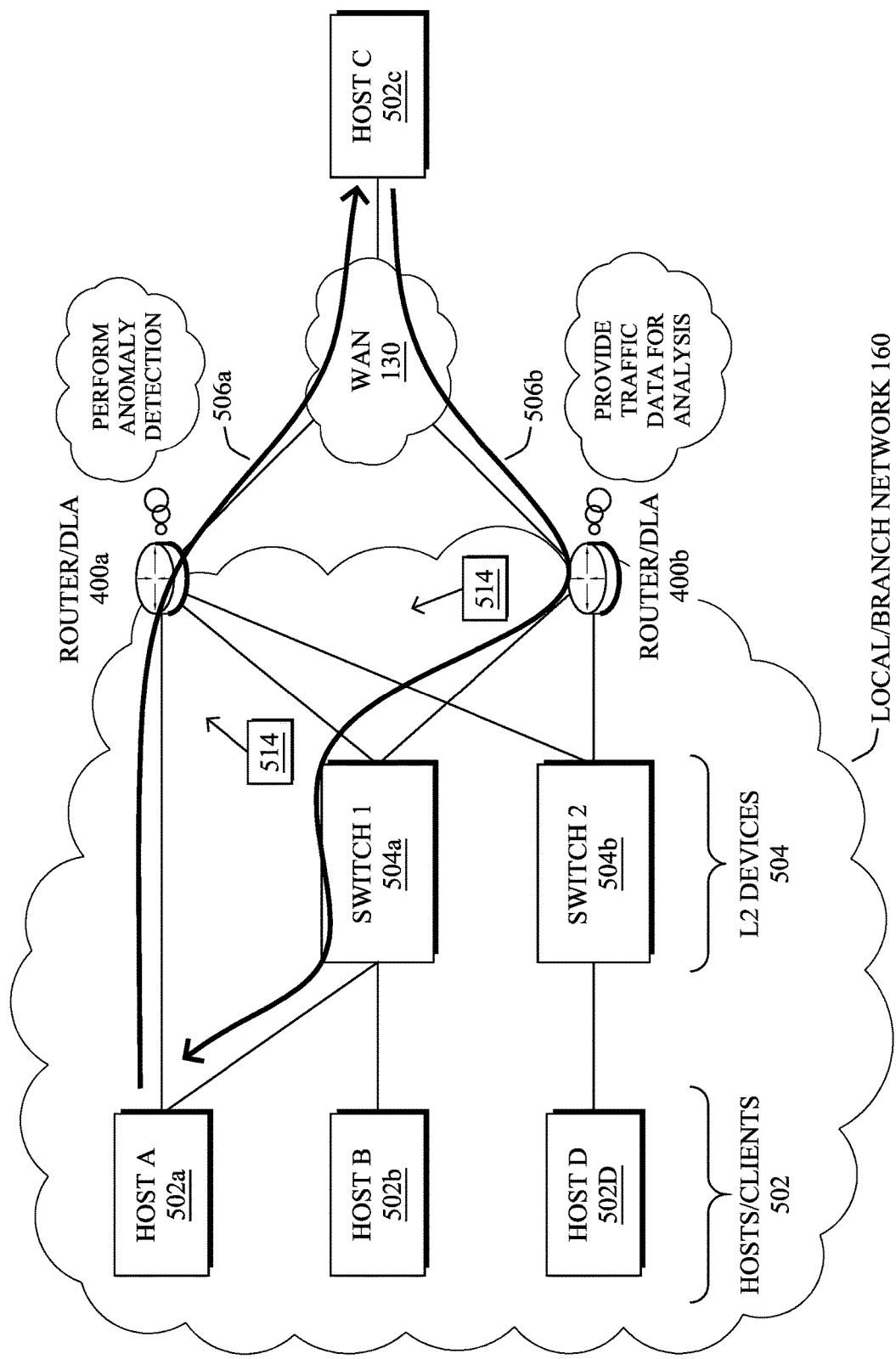

As shown in FIG. 5E, once a peer router has been elected, traffic data (e.g., Netflow records) comprising the characteristics of the traffic flow of interest is forwarded from the peer router to the elected router. For example, if router/DLA 400a is elected to model the conversation between hosts A and C (e.g., because router 400b is the most heavily taxed DLA in terms of resources, because most of the traffic 506 is routed through router 400a, etc.), then router 400b may provide traffic data 514 (e.g., Netflow or other traffic records, DPI results, etc.) to router 400a regarding traffic flow 506b. In turn, this allows router/DLA 400a to model all A-C traffic 506 with high fidelity.

In one embodiment, the primary in-charge router may also elect a dedicated network element to act as the DLA for purposes of analyzing traffic 506 for anomalies. In this situation, both the primary and the peer routers 400a-400b will send the details of the flows 506a-506b to this dedicated DLA. This situation may arise if the primary router detects that there are several peers present and merging and aggregating traffic records from several peers will result in higher overhead. In this situation, the peers and the primary routers could only be responsible for generating features for DPI and then relaying this back to the dedicated to DLA.

In another embodiment, no explicit election of a responsible router is performed and routers 400a-400b may simply send to each other information about the direction of the asymmetrical conversation that they are able to monitor. This allows each of them to keep an exhaustive model of the traffic they observe.

Referring now to FIGS. 6A-6D, in yet another embodiment, no explicit peer-present( ) message is sent between routers/DLAs 400a-400b. Instead, each of routers 400a-400b may rely on a traffic information broker 600 to mediate the information about the unobserved directions of a conversation flow. For example, router/DLA 400a may provide information 602a to broker 600 regarding traffic flow 506a, when router/DLA 400a identifies flow 506a as an orphan flow. In turn, broker 600 may store information 602a and wait for any information about the flow in the reverse direction.

If router/DLA 400b then provides information 602b to broker 600 regarding traffic flow 506b, broker 600 may match information 602a and 602b. Information 602a-602b may include, for example, flow statistics and other information regarding flows 506a-506b (e.g., the endpoint hosts, etc.). In turn, as shown in FIG. 6B, traffic information broker 600 may send information 602a to router/DLA 400b and information 602b to router/DLA 400a, thereby completing the exchange of information between the routers.

In some embodiments, traffic information broker 600 may execute as a service on a networking device, such as a router in the network. In another embodiment, the traffic information brokerage service can be load-balanced among a set of cooperating routers by using a distributed hash table mechanism. Note also that this brokerage mechanism allows for simplification of the control plane protocol, since no explicit election of monitoring peer is performed, but at the cost of a double transmission of the monitored data.

Figure 6C:
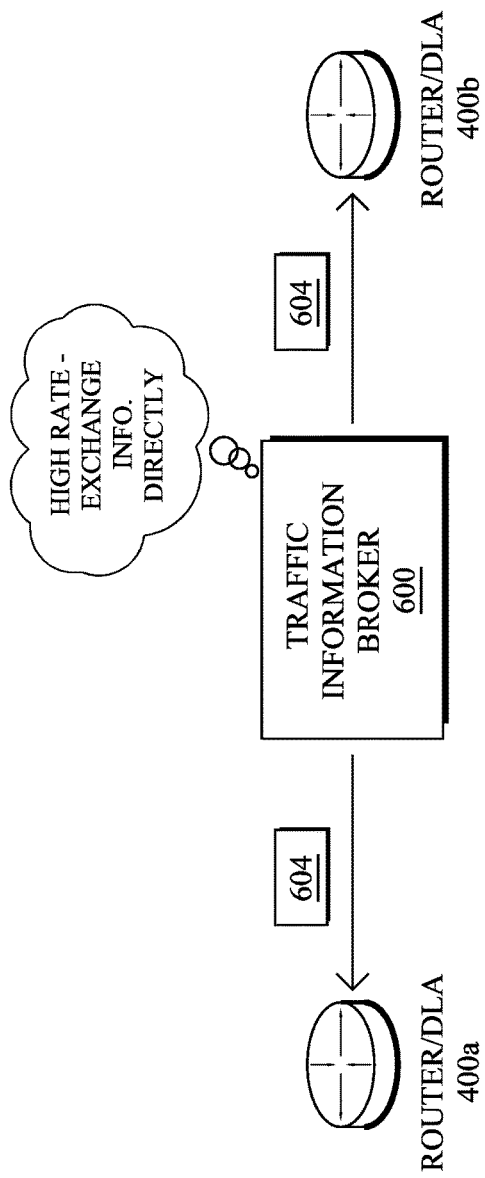
Figure 6D:
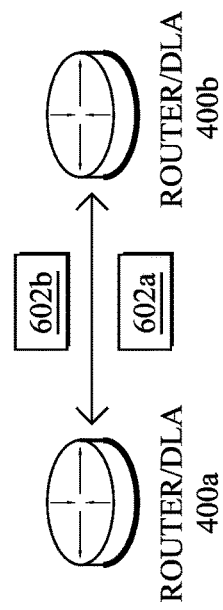

Referring now to FIGS. 6C-6D, a further optimization can be performed in case a high volume of monitored data is produced for certain host pairs. In particular, assume that the traffic 506 between hosts A and C is being monitored by routers 400a-400b. If the information rate of traffic 506 exceeds a threshold, broker 600 can send a peer_present( ) message 604 to both routers 400a-400b, as shown in FIG. 6C, so that they can send each other their observed information 602a-602b directly without broker 600 as a mediator, as shown in FIG. 6D.

Figure 7:
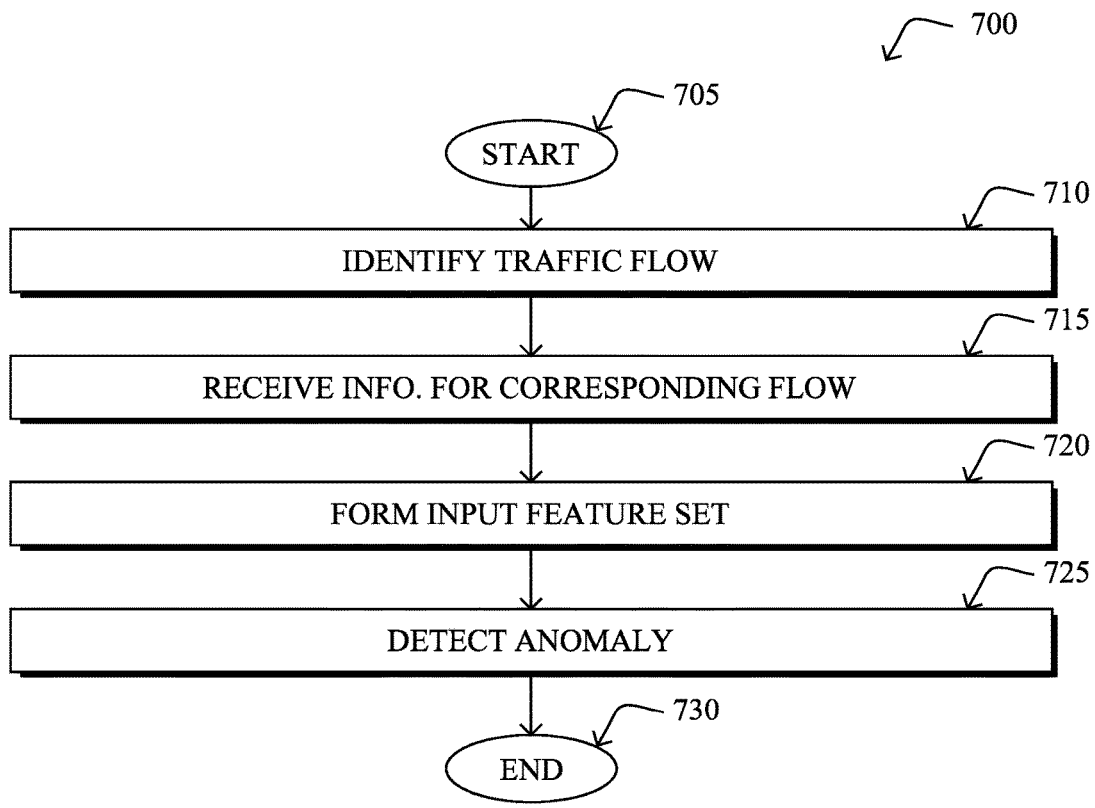
FIG. 7 illustrates an example simplified procedure for performing anomaly detection on asymmetrically-routed traffic.

FIG. 7 illustrates an example simplified procedure for performing anomaly detection on asymmetrically routed traffic, in accordance with various embodiments herein. Generally, procedure 700 may be performed by a specialized networking device, such as an edge router configured as a DLA (e.g., as part of an SLN). Procedure 700 may start at step 705 and continues on to step 710 where, as described in greater detail above, the device may identify a first traffic flow between two endpoints that traverses the first device in a first direction. For example, the identified traffic flow may be an orphan traffic flow, meaning that the flow traverses the device in the first direction, but the corresponding flow in the opposite direction may traverse a different networking device, such as in the case of asymmetrically routed traffic.

At step 715, as detailed above, the device may receive information regarding a second traffic flow between the two endpoints, but flowing in a second direction that is opposite that of the first direction. For example, the device may query other routers, etc. in the network, for the flow that is related to the flow identified in step 710. In turn, the other routers, etc., may provide information about the corresponding flow back to the device.

At step 720, the device may form an input feature set by merging characteristics of the two traffic flow, as described in greater detail above. For example, if the first traffic flow traverses the device, the device may capture characteristics of the flow (e.g., duration, packet size, application, protocol, statistics thereof, etc.). In addition, the other networking device may include characteristics of the second traffic flow in the information received in step 720. In turn, the device may merge the two traffic records, thereby forming a complete view of the conversation between the two endpoints.

At step 725, as detailed above, the device may detect an anomaly in the network by analyzing the input feature set from 720 using a machine learning-based anomaly detector. Such a detector may, for example, be configured to determine whether traffic behavior in the network statistically deviates from a modeled behavior. If so, the device may determine that the conversation (e.g., the two traffic flows) are part of the anomalous behavior and take any number of corrective measures, such as raising alerts, dropping or rerouting traffic, etc. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for gathering flow characteristics for anomaly detection systems in presence of asymmetrical routing. In particular, the techniques herein address a major issue related the issue of modeling traffic in a learning agent for flows subject to asymmetrical routing. Thanks to the techniques herein, the traffic characteristics for the flows of interest (e.g., subject to modeling) are aggregated on a single DLA for accurate modeling and anomaly detection. Note that the techniques herein specifically allow various peers to elect one of them to merge only those flows that are indeed affected by the asymmetrical routing, instead of blindly aggregating everything.

While there have been shown and described illustrative embodiments that provide for gathering flow characteristics for anomaly detection systems in presence of asymmetrical routing, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    identifying, by a first device in a network, a first traffic flow between two endpoints that traverses the first device in a first direction;
    receiving, at the first device, information from a second device in the network regarding a second traffic flow between the two endpoints that traverses the second device in a second direction that is opposite that of the first direction;
    merging, by the first device, characteristics of the first traffic flow captured by the first device with characteristics of the second traffic flow captured by the second device and included in the information received from the second device, to form an input feature set; and
    detecting, by the first device, an anomaly in the network by analyzing the input feature set using a machine learning-based anomaly detector.

2. The method as in claim 1, wherein the first and second devices are edge routers in the network.

3. The method as in claim 1, wherein receiving the information from the second device regarding the second traffic flow comprises:
    sending, by the first device, an indication of the identified first traffic flow to the second device to discover an asymmetrically routed traffic flow that corresponds to the first traffic flow.

4. The method as in claim 1, further comprising:
    coordinating, by the first device and with the second device, to assign the first device as responsible for anomaly detection analysis of the first and second traffic flows.

5. The method as in claim 4, wherein the assignment is based on one or more of:
    available resources on the each of the first and second devices to perform anomaly detection, or a proportion of the first and second flows that traverses the first and second devices.

6. The method as in claim 1, further comprising:
    providing, by the first device, information regarding the first traffic flow to a traffic information broker, wherein the first device receives the information from the second device regarding the second traffic flow via the traffic information broker in response to the traffic information broker matching the first and second traffic flows.

7. The method as in claim 6, wherein the traffic information broker is a load-balanced service distributed among routers in the network.

8. The method as in claim 6, further comprising:
    receiving, at the first device, a request from the traffic information broker to provide the information regarding the first traffic flow directly to the second device, in response to the traffic information broker determining that an information rate associated with the first and second traffic flows exceeds a threshold rate.

9. The method as in claim 1, further comprising:
providing, by the first device, the captured characteristics of the first traffic flow to the second device for anomaly detection by the second device.

10. An apparatus, comprising:
one or more network interfaces to communicate with a network;
a processor coupled to the network interfaces and configured to execute one or more processes; and
a memory configured to store a process executable by the processor, the process when executed operable to:
   identify a first traffic flow between two endpoints that traverses the apparatus in a first direction;
   receive information from a remote device in the network regarding a second traffic flow between the two endpoints that traverses the remote device in a second direction that is opposite that of the first direction;
   merge characteristics of the first traffic flow captured by the apparatus with characteristics of the second traffic flow captured by the remote device and included in the information received from the remote device, to form an input is feature set; and
   detect an anomaly in the network by analyzing the input feature set using a machine learning-based anomaly detector.

11. The apparatus as in claim 10, wherein the apparatus and the remote device are edge routers in the network.

12. The apparatus as in claim 10, wherein the apparatus receives the information from the remote device regarding the second traffic flow by:
   sending an indication of the identified first traffic flow to the remote device to discover an asymmetrically routed traffic flow that corresponds to the first traffic flow.

13. The apparatus as in claim 12, wherein the remote device caches the indication of the identified first traffic flow to proactively send the information regarding the second traffic flow to the apparatus.

14. The apparatus as in claim 10, wherein the process when executed is further operable to:
   coordinate, between the apparatus and the remote device, to assign the apparatus as responsible for anomaly detection analysis of the first and second traffic flows.

15. The apparatus as in claim 14, wherein the assignment is based on one or more of: available resources on the each of the apparatus and remote device to perform anomaly detection, or a proportion of the first and second flows that traverses the apparatus and remote device.

16. The apparatus as in claim 10, wherein the process when executed is further operable to:
   provide information regarding the first traffic flow to a traffic information broker, wherein the apparatus receives the information from the remote device regarding the second traffic flow via the traffic information broker in response to the traffic information broker matching the first and second traffic flows.

17. The apparatus as in claim 16, wherein the process when executed is further operable to:
   receive a request from the traffic information broker to provide the information regarding the first traffic flow directly to the remote device, in response to the traffic information broker determining that an information rate associated with the first and second traffic flows exceeds a threshold rate.

18. The apparatus as in claim 10, wherein the process when executed is further operable to:
   provide the captured characteristics of the first traffic flow to the remote device for anomaly detection by the remote device.

19. A tangible, non-transitory, computer-readable medium storing program instructions that cause a first device in a network to execute a process comprising:
   identifying, by the first device, a first traffic flow between two endpoints that traverses the first device in a first direction;
   receiving, at the first device, information from a second device in the network regarding a second traffic flow between the two endpoints that traverses the second device in a second direction that is opposite that of the first direction;
   merging, by the first device, characteristics of the first traffic flow captured by the first device with characteristics of the second traffic flow captured by the second device and included in the information received from the second device, to form an input feature set; and
   detecting, by the first device, an anomaly in the network by analyzing the input feature set using a machine learning-based anomaly detector.

20. The computer-readable medium as in claim 19, wherein the process further comprises:
   receiving, at the first device, information from a third device in the network regarding the second traffic flow.

* * * * *